United States Patent
Kumar et al.

(10) Patent No.: US 6,501,591 B1
(45) Date of Patent: Dec. 31, 2002

(54) TUNABLE FIBER OPTIC PARAMETRIC OSCILLATOR

(75) Inventors: Prem Kumar, Skokie, IL (US); Darwin Serkland, Albuquerque, NM (US); Lijun Wang, Evanston, IL (US); Yikai Su, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 09/431,550

(22) Filed: Oct. 29, 1999

Related U.S. Application Data (60) Provisional application No. 60/115,203, filed on Jan. 7, 1999.

(51) Int. Cl.[7] .................................................. G02F 1/35
(52) U.S. Cl. ........................ 359/330; 359/326; 359/332
(58) Field of Search ......................... 359/337.1, 341.3, 359/330, 326, 332, 109, 341.5, 483, 566, 578; 385/11, 37

(56) References Cited

U.S. PATENT DOCUMENTS 4,255,017 A * 3/1981 Hasegawa ................... 359/238
5,841,570 A * 11/1998 Velsko ........................ 359/330

* cited by examiner

Primary Examiner—Frank G. Font
Assistant Examiner—Roy M. Punnoose
(74) Attorney, Agent, or Firm—McAndrews, Held & Malloy, Ltd.

(57) ABSTRACT

A tunable fiber optic parametric oscillator includes a non-linear optical loop mirror or fiber Sagnac interferometer NFSI with a dispersion shifted fiber portion. The oscillator is synchronously pumped to amplify a signal wave, while reflecting the depleted pump pulse back towards the pump. The amplified signal wave and simultaneously generated idler waves are directed to a spectral filter. The spectral filter may be a diffraction grating, a Faraday mirror or other optical filter that is tunable to change the signal wavelength that is reflected back to the NFSI. The fiber optic parametric oscillator is tunable over substantially the entire gain bandwidth and is insensitive to the polarization of the pump pulses. The fiber optic parametric oscillator may be used as a tunable source of short pulses for high speed optical communication systems. The fiber optic parametric oscillator may also be used for synchronization and clock recovery.

41 Claims, 9 Drawing Sheets

RL=-70dB  RB=10.0Hz  CENTER 564.980294MHz  10.00 dB/div
ATTEN=0dB  VB=-10.0Hz  SPAN FREQ. 5.000KHz  ST 150.0SEC

FIG. 20B

RL=-60dB  RB=10.0Hz  CENTER 564.994091 MHz  10.00dB/div
ATTEN = 0dB  VB=10.0Hz  SPAN FREQ. 5.000 KHz  ST 150.0SEC

TUNABLE FIBER OPTIC PARAMETRIC OSCILLATOR

CROSS-REFERENCE TO RELATED APPLICATIONS

This application claims the priority of provisional application Ser. No. 60/115,203 filed Jan. 7, 1999. That application is hereby incorporated herein by reference.

STATEMENT REGARDING FEDERALLY SPONSORED RESEARCH OR DEVELOPMENT

This work was supported in part by the Defense Advanced Research Projects Agency through the AFOSR under Grant No. F49620-96-1-0262.

FIELD OF THE INVENTION

The present invention relates to a fiber optic parametric oscillator and more particularly to a wavelength tunable fiber optic parametric oscillator.

BACKGROUND OF THE INVENTION

Fiber optic parametric oscillators in the form of a modulational instability laser are known in which all of the pump, signal and idler waves are resonated inside a fiber ring cavity. The operation of this system, however, is undesirably phase sensitive because all three of the waves are resonant. Known fiber optic parametric oscillators have oscillated at the point of modulational instability where the gain of the signal is at a maximum. However, the oscillation frequency can be shifted by only a small amount by changing the pump power. They are therefore, not tunable to a desired frequency over the gain bandwidth.

Further, in known parametric oscillators the parametric response depends on the pump polarization. If the signal polarization drifts towards a polarization state that is orthogonal to the polarization of the pump, the gain of the signal is reduced to a fraction of the maximum gain, achievable when the polarization of the pump and signal are the same.

BRIEF SUMMARY OF THE INVENTION

In accordance with the present invention, the disadvantages of prior fiber optic parametric oscillators have been overcome. The fiber optic parametric oscillator of the present invention is single wave resonant and is tunable over substantially the entire gain bandwidth.

More particularly, the tunable fiber optic parametric oscillator of the present invention includes a fiber parametric amplifier that receives a pump wave and a synchronous signal wave wherein the amplifier separates the pump wave, while amplifying the synchronous signal wave. A spectral filter receives the signal wave from the amplifier, the filter being tunable to reflect a signal wave of a particular wavelength back to the fiber parametric amplifier so as to provide non-degenerate operation of a synchronously pumped fiber optic parametric oscillator.

In one embodiment, the fiber parametric amplifier is in the form of a nonlinear fiber Sagnac interferometer or a nonlinear optical loop mirror having a pump wave port and a signal wave port with a dispersion shifted fiber portion therebetween for amplifying a signal wave having a signal pulse coincident with a pump wave pulse and simultaneously generating an idler wave. The pump wave is reflected back to the pump wave port whereas the signal and idler waves pass through the signal port and are directed to the spectral filter. The spectral filter may be a diffraction grating, or other optical filter that is tunable.

These and other advantages and novel features of the present invention, as well as details of an illustrated embodiment thereof, will be more fully understood from the following description and drawings.

DETAILED DESCRIPTION OF THE INVENTION

Figure 1:
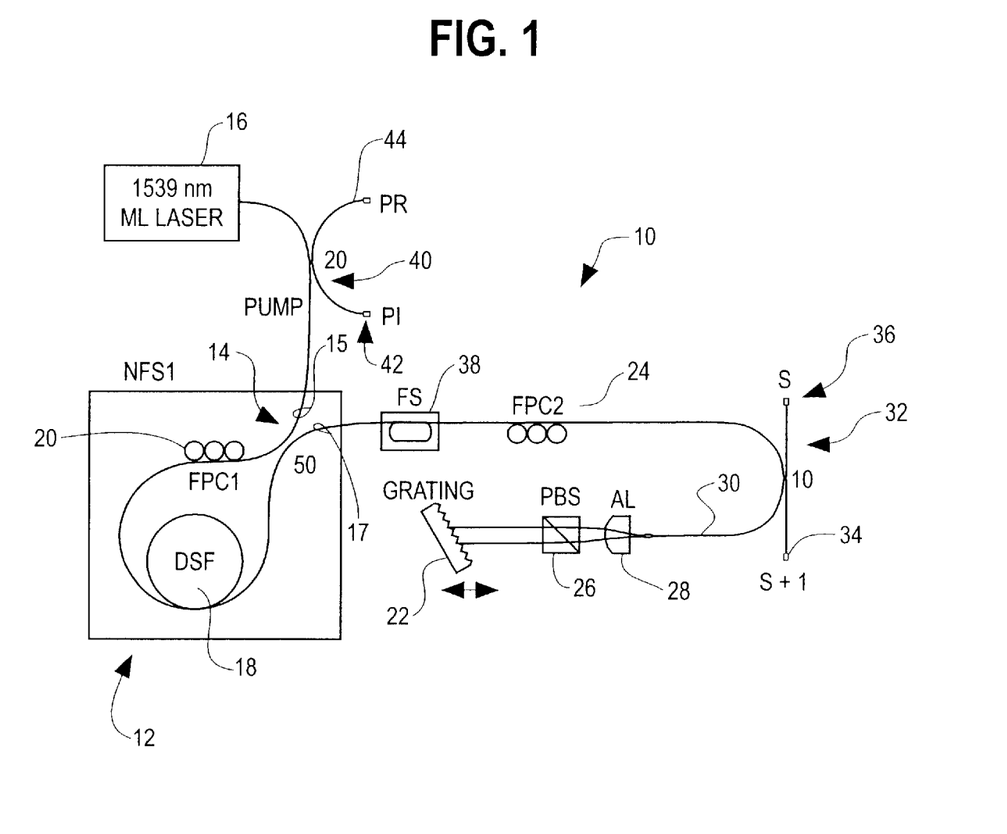
FIG. 1 is a block diagram of the tunable fiber optic parametric oscillator of the present invention.

The tunable fiber optic parametric oscillator 10 of the present invention as shown in FIG. 1 includes a fiber parametric amplifier 12 having a 50/50 coupler 14 for receiving via a first port 15 pump pulses from a pump 16. The pump is a synchronously-pumped mode-locked color-center laser that delivers a 100 MHz train of 7.7 ps pump pulses at 1539 nm to the fiber parametric amplifier 12. The fiber parametric amplifier 12 is in the configuration of a nonlinear fiber Sagnac interferometer (NFSI) containing 105 m of dispersion-shifted fiber (DSF) 18 and 1.1 m leads of SMF-28 fiber from the 50/50 coupler 14. The dispersion-shifted fiber 18 has a nonlinearity of $\gamma=2.4$ $W^{-1}$ $km^{-1}$ and a zero-dispersion wavelength of $\lambda_0=1538\pm1.5$ nm with a slope $d\beta_2/d\lambda=-0.1$ $ps^2$ $km^{-1}$ $nm^{-1}$. A first fiber polarization controller FPC1 20 is provided so that upon its adjustment, the pump pulses of light from the pump 16 are substantially, completely reflected from the NFSI.

If a non-degenerate signal pulse, coincident in time, i.e. synchronous, with a pump pulse impinges upon the signal port 17 of the 50/50 coupler of the NFSI, it is parametrically amplified in the dispersion-shifted fiber 18 and an idler wave is simultaneously created. While the depleted pump pulse is reflected from the NFSI and returns via the 50/50 coupler towards the pump laser 16, the signal and idler wave pulses exit through the signal port of the NFSI coupler 14 and travel towards a spectral filter formed by a diffraction grating 22 disposed at the end of the fiber cavity. The spectral filter 22 reflects only the signal of a particular wavelength as determined by the angle of the diffraction grating 22 back to the NFSI. If the cavity round-trip time of the signal pulse equals an integer multiple of the pump-laser repetition period, i.e. synchronism and the unsaturated parametric gain exceeds the round-trip cavity loss, then parametric oscillation occurs at the signal wavelength.

A second fiber polarization controller FPC2 24 is disposed between the signal port of the 50/50 coupler 14 and the diffraction grating. The second fiber polarization controller is adjusted so that a signal wave having the same polarization as the pump wave inside the NFSI is transmitted with low loss through a polarization beam splitter (PBS) 26. The polarization beam splitter is disposed between the diffraction grating 22 and a collimating aspheric lens 28 that directs the signal wave reflected from the grating 22 back into the fiber 30. A 10/90 fused-fiber coupler 32 within the cavity provides 10% output coupling in each direction. Specifically, the coupler 32 provides 10% of both the signal and idler waves that emerge from the parametric amplifier 12 before the grating 22 on an output port 34. The coupler 32 also provides on an output port 36, 10% of the signal wave reflected from the grating 22 as it is directed back to the parametric amplifier 12. If desired, for diagnostic purposes, the passive section of the cavity may contain a piezoelectric fiber stretcher (FS) 38 that is used to scan the optical path length by a few microns for diagnostics. Further, a 20/80 coupler 40 may be disposed between the pump 16 and the NFSI so as to provide 20% of the pump wave from the laser 16 on an output port 42 and to provide 20% of the pump wave reflected from the NFSI on an output port 44 so that these waves can be monitored.

All of the fiber components may be made of SMF-28 fiber, except for the 105 m of the dispersion shifted fiber. Further, the fiber polarization controller 20 is preferably formed using dispersion shifted fiber wrapped on the controller since this type of fiber contributes less bending loss than SMF-28 fiber. A 1.8 m length of dispersion shifted fiber may also be used on the second fiber polarization controller 24 as well. The dispersion shifted fiber on the first fiber polarization controller is as described above for the DSF 18 in the NFSI. The dispersion shifted fiber on the second fiber polarization controller 24 is similar but has $\lambda_0=1548$ nm. The SMF-28 fiber has a nonlinearity $\gamma=1.5$ $W^{-1}$ $km^{-1}$ and GVD $\beta_2=-19.5$ $ps^2$ $km^{-1}$ at 1539 nm. Ideally, the fiber in the NFSI should have large nonlinearity and very slightly negative GVD at the pump wavelength, whereas the passive section of the cavity should have no nonlinearity or dispersion.

The power gain of the non-degenerate signal is $$G_s = \cosh^2(gL) + \left(\frac{\delta k}{2g}\right)^2 \sinh^2(gL),$$

where $g=\sqrt{(\gamma P_p)^2-(\delta K/2)^2}$ is an effective gain coefficient; $\gamma$ is the fiber nonlinear coefficient; the pump power propagating inside the Sagnac interferometer (in each direction) is $P_p=P_{pe}/2$ where $P_{pe}$ is the external pump power incident upon the NFSI; and L is the fiber length. The effective k-vector mismatch $\delta k=2\gamma P_p+(k_s+k_i-2k_p)$ can be expressed as $$\delta k = 2\gamma P_P + 2\sum_{m=1}^{\infty} \frac{\beta_{2m}}{(2m)!}(\omega_s - \omega_p)^{2m},$$

where $\beta_{2m}=d^{2m}k/d\omega^{2m}$ is the $2^m$-th order dispersion coefficient of the fiber at the pump wavelength.

Figure 2:
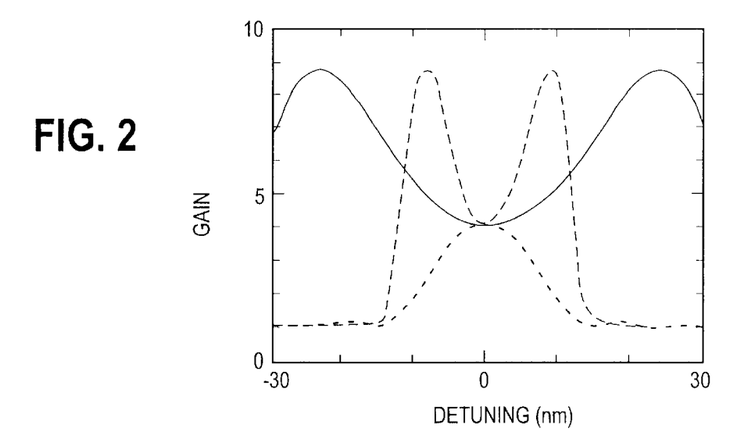
FIG. 2 is a graph illustrating the non-degenerate parametric gain $G_S$ versus detuning from the pump wavelength.

FIG. 2 is a plot of the signal gain versus detuning from the pump wavelength for three different values of the product $\beta_2 L$. The dotted curve shown in FIG. 2 corresponds to the case of normal GVD ($\beta_2>0$), for which effective phase matching ($\delta k=0$) can never occur. The solid and dashed curves correspond to anomalous GVD ($\delta_2<0$), for which effective phase matching occurs at wavelengths where the peaks in the gain appear in FIG. 2. These non-degenerative gain peaks are the basis of modulational instability. At degeneracy, even though effective phase matching is impossible, gain is achievable. A linearized analysis of the degenerate interaction predicts phase sensitive gain with a maximum value of $G_s(\phi_{max})=1+(2\gamma P_p L)^2$, which is larger than the non-degenerate gain obtained near degeneracy. For pulsed interactions, the equations above govern the instantaneous powers, provided that the pump bandwidth and fiber GVD are small enough that the pump pulse intensity profile does not evolve and the pulses do not walk off each other in the NFSI. The wide and somewhat flat gain profile such as the one shown by the solid curve in FIG. 2 is ideally suited for constructing a broadly tunable oscillator in accordance with the present invention having a tunable spectral filter in the cavity to transmit only the desired signal frequency, thus determining the oscillating wavelength. This is in contrast to prior systems that exploited the gain profiles with the narrow peaks that determined the oscillation wavelengths. Those prior systems can be tuned only slightly by changing the pump power which also causes large changes in the output power.

Figure 3:
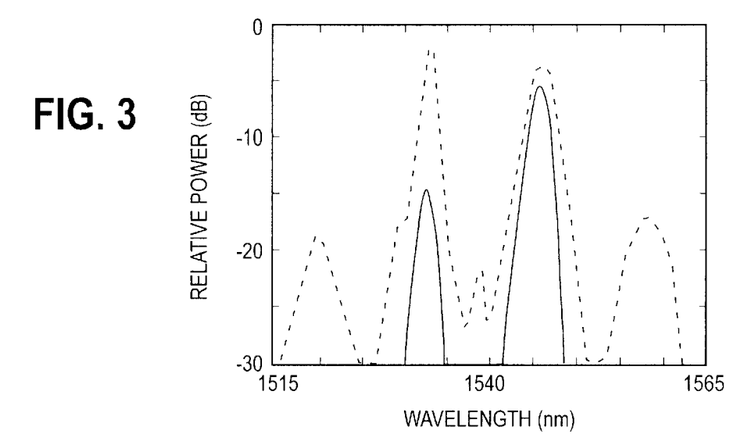
FIG. 3 is a graph illustrating the spectrum of the fiber optic parametric oscillator wherein the dotted curve represents the signal and idler wave output before the diffraction grating and the solid curve is the signal wave reflected from the diffraction grating.

FIG. 3 illustrates the spectrum of the fiber optic parametric oscillator output from the 10/90 coupler 32. The spectrum at port 34 is depicted by the dotted line in FIG. 3 which shows both the signal wave and idler wave that emerge from the parametric amplifier 12. Although the idler peak at 1533 nm is the tallest, the signal peak at 1545 nm is wider and therefore carries more power. The pump wave appears 20 dB below the signal and idler peaks due to the typical 30 dB of isolation that is achieved by balancing the NFSI using the first fiber polarization controller 20. The spectrum at port 36 depicted as the solid curve shows that after reflection from the diffraction grating 22, it is primarily the signal wave that returns to the parametric amplifier 12. It is noted that the signal wave spectrum narrows slightly upon reflection from the grating because the 2.9 nm bandwidth of the spectral filter is smaller than the incident signal bandwidth.

Figure 4:
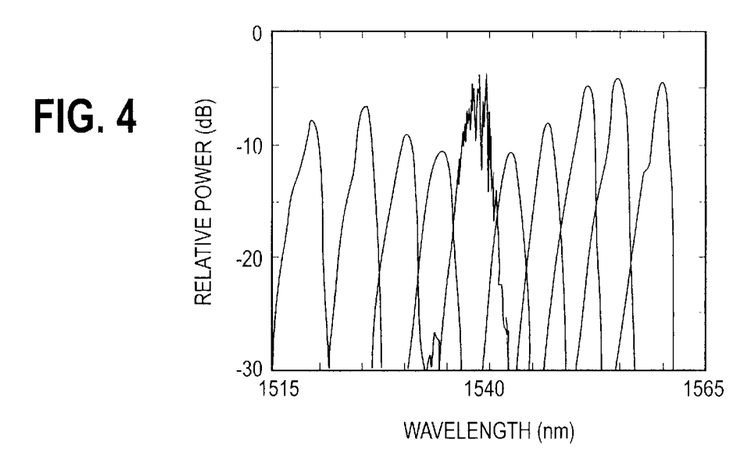
FIG. 4 is a graph illustrating a composite of the signal wave output peaks observed for ten different settings of the angle of the diffraction grating.

FIG. 4 illustrates the tuning of the fiber optic parametric oscillator over a 40 nm range wherein the oscillator is tuned to 10 different wavelength settings. The oscillator is tuned by tilting the diffraction grating 22 to change the signal wavelength that is diffracted back into the fiber 30. The signal spectrum for each of the 10 different settings of the grating angle are shown in composite in FIG. 4. The idler peaks have been omitted from FIG. 4 for clarity, the idler peaks typically being 10 dB below the corresponding signal peak. As can be seen, the signal peaks increase in height as the spectral filter is tuned away from degeneracy which is consistent with the predicted parametric gain profile. At degeneracy the phase sensitive nature of the gain yields a noisy output since the round-trip phase shift is not stabilized. It is noted that as the signal length is increased by tuning the spectral filter, it is necessary to decrease the cavity length at a rate of 49±8 $\mu$m/nm in order to maintain the optimum output. This behavior can be quantitatively explained from the fact that the passive section of the cavity contains 9.6 m of SMF-28 fiber which causes longer delays for pulses at longer wavelengths. The need for cavity length adjustments when tuning can be reduced by minimizing the average GVD in the passive section of the cavity, either by using DSF throughout or by adding a proper length of positive GVD dispersion compensating fiber to balance the negative GVD of the SMF-28 fiber. Alternatively, an electric feedback circuit can readily be implemented that automatically adjusts the cavity length to maintain the optimum output.

Figure 5:
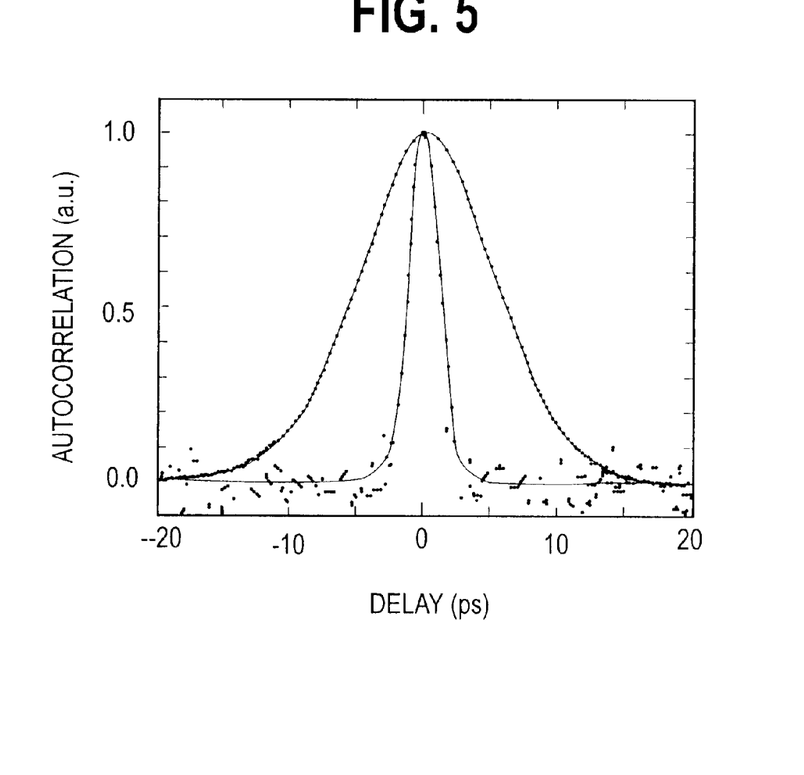
FIG. 5 is a graph illustrating the autocorrelation curves of the input pump pulses and the output signal pulses.

FIG. 5 shows autocorrelation data for the input pump and the output signal pulses. The input pump pulse is the wide pulse, and the output signal pulse, is the narrower pulse.

Figure 6:
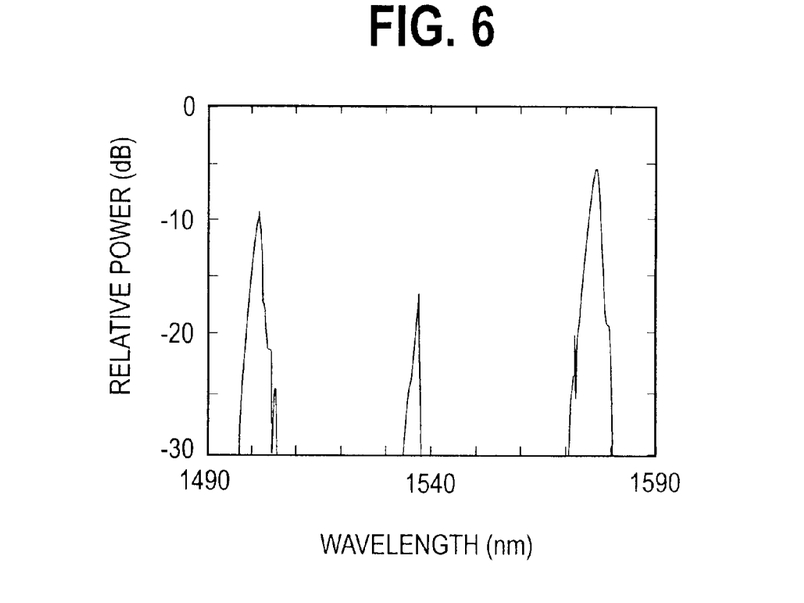
FIG. 6 is a graph illustrating the spectrum of the output when the fiber optic parametric oscillator is pumped at 1537 nm and tuned as far as possible from degeneracy.

FIG. 6 illustrates an increased signal-idler separation of 74 nm that was achieved by adjusting the pump wavelength to 1537 nm. The results of pumping at 1539 nm and 1537 nm indicate how the tuning range depends upon the relative positioning of the zero dispersion wavelength and the pump wavelength. In this embodiment, the singly-resonant pulsed fiber optic parametric oscillator can be tuned over a 74 nm range encompassing the entire gain bandwidth of Er-doped fiber amplifiers. Alternatively, similar tunable fiber optic parametric oscillators can be made near 1310 nm where standard telecommunication fiber has zero dispersion and mode-locked Nd-doped lasers are available for pumping.

Figure 7:
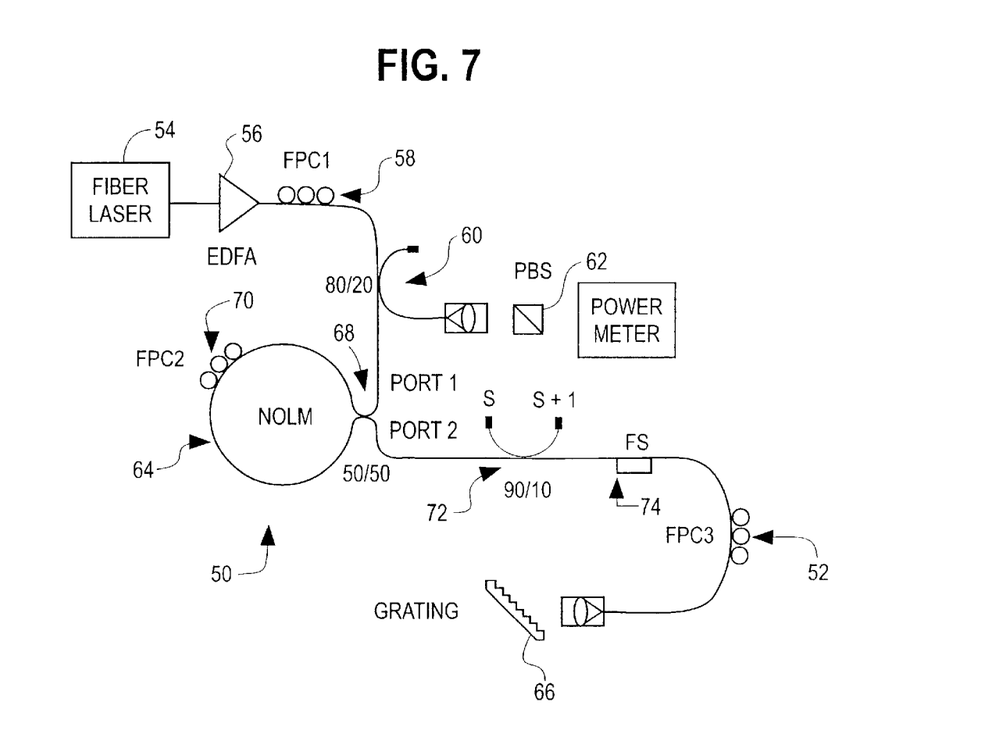
FIG. 7 is a block diagram of a second embodiment of the tunable fiber optic parametric oscillator of the present invention that is insensitive to the polarization of the pump.

In a second embodiment of the present invention, as shown in FIG. 7, the tunable fiber optic parametric oscillator 50 is made insensitive to the state of the polarization of the pump laser so as to eliminate the need for the polarization beam splitter 26 shown in FIG. 1. By setting the orientation of a fiber polarization controller FPC3 52 to obtain stable oscillation regardless of the orientation of the pump polarization, as discussed below, the output signal polarization tracks the pump polarization.

As shown in FIG. 7, the fiber optic parametric oscillator 50 is pumped by a passively mode-locked Er/Yb-doped fiber laser 54 to provide an all fiber system configuration. The fiber laser 54 delivers a 14 MHz train of 2.9 ps (FWHM) pump pulses at 1541 nm with average power of 1.5 mW. An Erbium-Doped Fiber Amplifier (EDFA) 56 boosts the power to 7 mW. In order to test the sensitivity of the oscillator 50 to the state of the polarization of the pump pulses, a fiber polarization controller FPC1 58 is placed between the amplifier 56 and the fiber optic parametric oscillator 50. A polarization-independent 20/80 coupler 60 is used to direct 20% of the pump power to a polarization beam splitter 62. The pump pulses from the coupler 60 are collimated into free space and passed through the polarization beam splitter 62 which is rotated to determine the orientation of the pump polarization.

The fiber optic parametric oscillator 50 consists of a nonlinear fiber Sagnac interferometer to provide the parametric gain and a grating 66 that provides feedback. More particularly, the nonlinear fiber Sagnac interferometer 64 is formed by a 105 m long piece of dispersion shifted fiber with a 0-dispersion wavelength of $\lambda_0$=1538 nm which is configured into a Nonlinear Optical Loop Mirror (NOLM) using a polarization-independent 50/50 coupler 68. A fiber polarization controller FPC2 70 is inserted into the loop of the NOLM 64 and adjusted so that the pump pulses are totally reflected from port 1 of the NOLM 64. By adjusting the fiber polarization controller FPC2 70 in this manner, the pump leakage into port 2 of the NOLM 64 is less than −35 dB. Once the fiber polarization controller FPC2 70 is set, the leakage level does not change as the fiber polarization controller FPC1 58 is rotated to alter the input pump polarization during testing.

When a signal pulse enters port 2 of the NOLM 64 coincidentally with a pump pulse from port 1, the signal pulse is parametrically amplified and an idler pulse is simultaneously created as discussed above. While the pump pulses return towards the fiber laser 54, the signal and idler pulses exit from port 2 and travel in the fiber optic parametric oscillator cavity towards the grating 66. The grating 66 is mounted in the Littrow configuration and is adjusted for only the signal wavelength to be retro-reflected. By changing the grating angle, the retro-reflection wavelength can be tuned over the whole bandwidth of the parametric gain. The 3 dB bandwidth of the grating reflection is 2.9 nm and the return loss is 1.3 dB at 1550 nm. As discussed above, when the unsaturated parametric gain provided by the NOLM exceeds the round-trip cavity loss, oscillation can build up in the fiber optic parametric oscillator cavity. The oscillation self-starts either from the pump leakage or from the quantum noise in the cavity. An intra-cavity 10/90 coupler 72 provides 10% output coupling in both directions so as to allow the signal and idler pulses to be monitored together at the S+I port as these pulses travel towards the grating 66. Because the grating is spectrally selective, only the signal pulses are reflected from the grating 66 and they are monitored at the S port of the coupler 72. A piezoelectrically driven fiber stretcher (FS) 74 in the cavity can be used to tune the cavity path length by a few microns for diagnostic purposes.

Figure 8A:
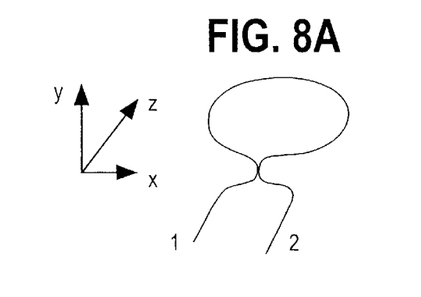
FIGS. 8A–8E are graphs illustrating the evolution of the pump and signal pulses for the embodiment of the invention depicted in FIG. 7.

The fiber polarization controller FPC3 52 is placed in the cavity of the fiber optic parametric oscillator 50 between the coupler 72 and the grating 66 with the orientation of the controller 52 set as follows to obtain stable oscillation regardless of the orientation of the pump polarization. For maximum parametric gain, the signal pulse is co-polarized with the pump as it propagates in the NOLM 64. This is because the Kerr nonlinearity in the fused-silica fiber is three times larger for co-polarized interaction than for cross-polarized interaction. For the coordinates as depicted in FIG. 8A, the Jones matrix for the incident pump pulses can be expressed as $$\begin{bmatrix} \cos\theta \\ e^{i\phi}\sin\theta \end{bmatrix}.$$

The reflected pump pulses and consequently the oscillating signal pulses upon exiting from port 2 of the 50/50 coupler 68 of the NOLM 64 should have the following Jones matrix:

$$\begin{bmatrix} -\cos\theta \\ e^{i\phi}\sin\theta \end{bmatrix}.$$

After passing through the fiber polarization controller FPC3 52 towards the grating 66 the Jones matrix of the signal pulses becomes $$J \cdot \begin{bmatrix} -\cos\theta \\ e^{i\phi}\sin\theta \end{bmatrix}$$

where J is the Jones matrix for the controller FPC3 52. After being reflected by the grating 66, the signal pulses pass through the controller FPC3 52 again and upon reaching port 2 of the NOLM 64, the total Jones matrix becomes $$J \cdot e^{i\pi} \cdot J \begin{bmatrix} -\cos\theta \\ e^{i\phi}\sin\theta \end{bmatrix}$$

where $\pi$ in $e^{i\pi}$ is the phase change due to reflection from the grating. This assumes that the cavity resonance condition is satisfied, i.e., the round-trip phase shift is a multiple of $2\pi$. In steady state, the reflected signal polarization matches the incident pump polarization for maximum parametric gain. Therefore, $$\begin{bmatrix} \cos\theta \\ e^{i\phi}\sin\theta \end{bmatrix} = J \cdot e^{i\pi} \cdot J \begin{bmatrix} -\cos\theta \\ e^{i\phi}\sin\theta \end{bmatrix}.$$

One solution for J in the above equation is $$J = \begin{bmatrix} 1 & 0 \\ 0 & -i \end{bmatrix}.$$

Based on the above solution, the proper orientation of FPC3 52 to obtain stable oscillation regardless of the orientation of the pump polarization is to set FPC3 52 as a quarter wave plate. Since this solution for J does not depend on $\theta$ or $\phi$, which are arbitrary, the pump polarization does not affect the signal gain. The signal polarization at the output port S of the coupler 72 varies and tracks the polarization of the incident pump provided that the latter does not change on time scales faster than a few cavity round-trip times.

Figure 8B:
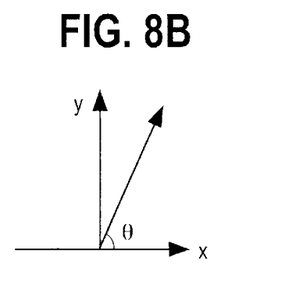
Figure 8C:
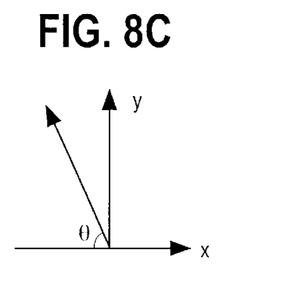
Figure 8D:
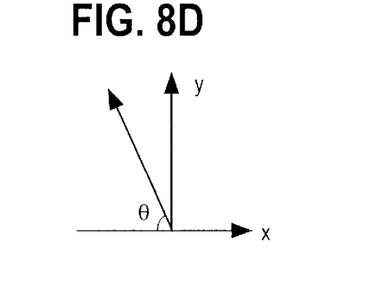
Figure 8E:
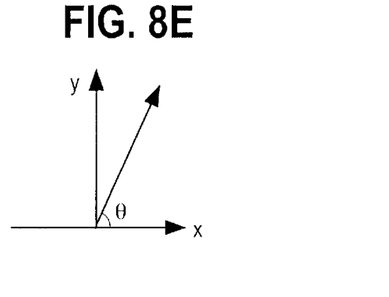

FIGS. 8B–E graphically illustrate the polarization evolution of the pump and signal pulses when the fiber polarization controller FPC3 is set to the solution discussed above and it is assumed $\phi=0$. Specifically, FIG. 8B illustrates the pump polarization before entering the NOLM 64 at port 1 of the coupler 68. FIG. 8C illustrates the polarization of the pump pulses exiting from the NOLM 64 at port 1 of the coupler 68. As can be seen from FIG. 8D, the signal pulses exiting from the NOLM 64 at port 2 of the coupler 68 have the same polarization as the pump pulses exiting from the NOLM 64 at port 1. FIG. 8E illustrates the polarization of the signal pulses upon reflection from the grating 66 which are rotated by $2\theta$. As can be seen from FIGS. 8B and 8E, the polarization of the signal pulses tracks the polarization of the pump pulses.

Figure 9:
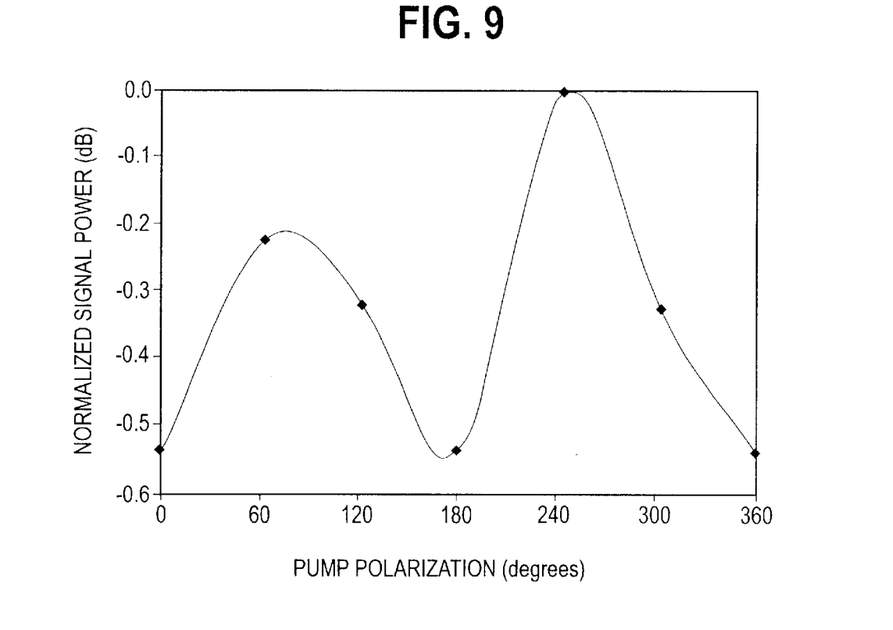
FIG. 9 illustrates the output signal power plotted as a function of the angle of polarization of the pump.

FIG. 9 illustrates the change in the output signal power plotted as a function of the angle of polarization of the pump as obtained by adjusting the fiber polarization controller FPC1 58 to vary the polarization of the pump pulses. As shown in FIG. 9, the signal power variation is less than 0.6 dB over the whole 360° range. The output signal polarization tracks the pump polarization and, in addition, the spectrum and pulse width of the signal pulses does not change while varying the pump polarization.

Figure 10:
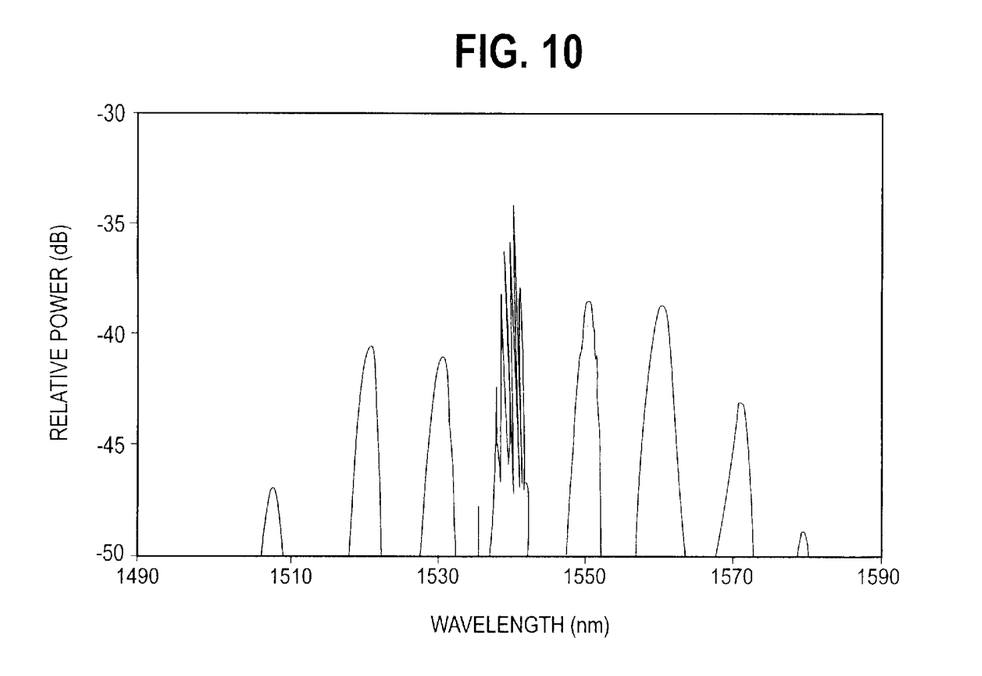
FIG. 10 is a composite spectrum of the signal pulses measured at port S shown in FIG. 7.

FIG. 10 is a composite spectrum of the signal pulses measured at port S of the coupler 72 wherein each of the eight peaks shown correspond to a different setting of the angle of the grating 66. In FIG. 10, the idler peaks have been omitted for clarity. As shown in FIG. 10, the output of the fiber optic parametric oscillator 50 is tunable over a 72 nm range. The variation of power with wavelength can be suppressed by amplifying the output with a saturated Erbium-Fiber Amplifier. The peak near 1541 nm corresponds to the degenerate operation of the fiber optic parametric oscillator, i.e., $\omega_p = \omega_s$. For this setting, the parametric gain in the NOLM 64 becomes phase sensitive and the output signal fluctuates randomly since the cavity length is not stabilized. In addition, the signal gain is higher. The average output signal power at port S of the coupler 72 was measured to be 6 $\mu$W at 1560 nm.

Figure 11:
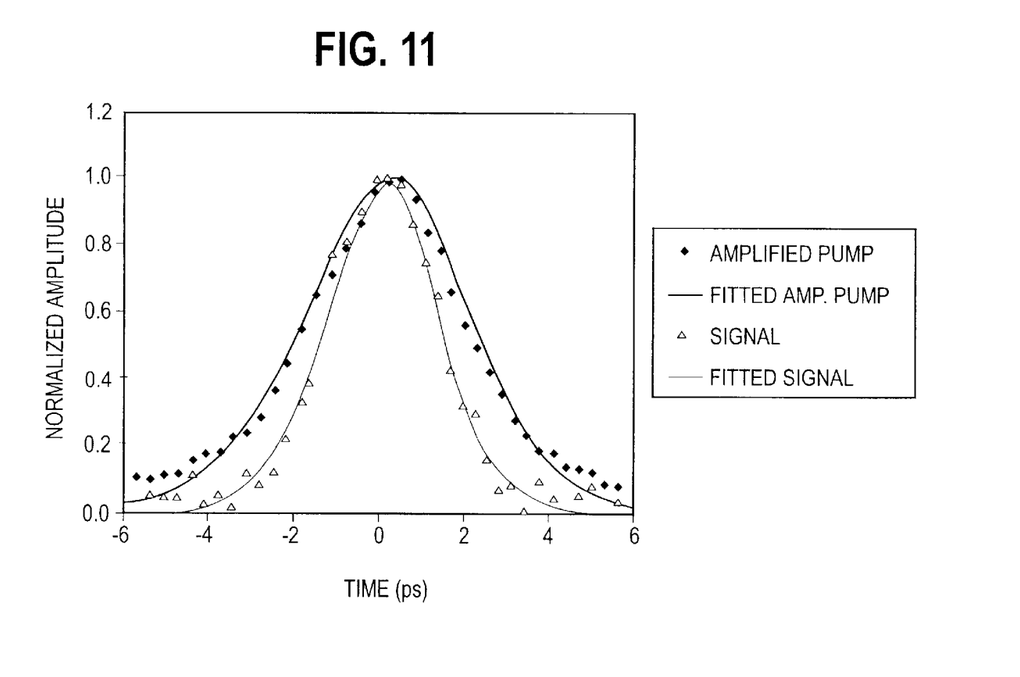
FIG. 11 is an illustration of the intensity autocorrelation data for the pump and signal pulses.

FIG. 11 is an illustration of the intensity autocorrelation data for the input pump pulses after amplification by the amplifier 56 and the output signal pulses at port S of the coupler 72 when the fiber optic parametric oscillator 50 was tuned at 1560 nm. The solid curves are theoretical autocorrelation functions of $\text{sech}(t/T_0)$-shaped pulses. The corresponding FWHM pulse-widths are 2.9 ps and 2.0 ps for the pump and the output signals respectively.

Figure 12:
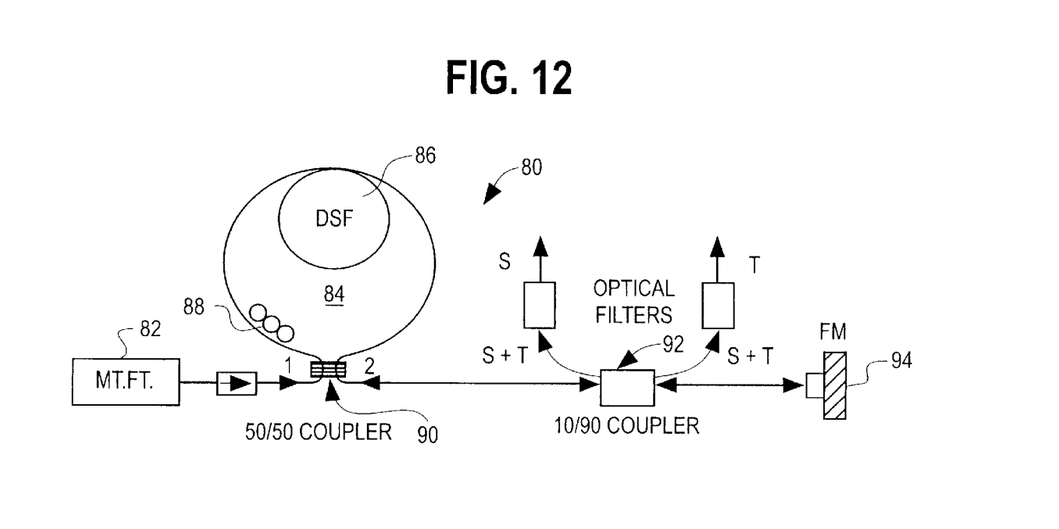
FIG. 12 is another embodiment of the fiber optic parametric oscillator of the present invention which operates at multiple wavelengths.

In still another embodiment of the present invention as shown in FIG. 12, a fiber optic parametric oscillator 80 operates at multiple wavelengths that can be tuned by adjusting the pump power. The multi-wavelength fiber optic parametric oscillator 80 includes a Faraday mirror 94 instead of a grating so as to reflect signal and idler pulses of multiple wavelengths. In this embodiment, the Faraday mirror also compensates for polarization automatically. More particularly, as shown in FIG. 12, a mode-locked fiber laser 82 generates a 14 MHz train of 2.5 ps pulses that are used to synchronously pump a nonlinear optical loop mirror, NOLM 84. The NOLM 84 consists of 105 m piece of dispersion shifted fiber 86 spliced to two 1.1 m leads of a SMF-28 fiber from a 50/50 coupler 90. The dispersion shifted fiber acts as the parametric gain fiber with a nonlinear coefficient of $\gamma=2.4\ W^{-1}\ km^{-1}$, zero-dispersion wavelength $\gamma_0=1538$ nm and dispersion slope $dD/d\lambda=0.06$ ps $nm^{-1}\ km^{-1}$. A fiber polarization controller 88 in the NOLM is adjusted to make the NOLM a perfect reflector as described above wherein the pump pulses are separated from the resulting signal and idler pulses. The passive section of the cavity is made of 6 m of dispersion shifted fiber, 16 m of SMF-28 fiber and 3 m of dispersion compensating fiber. The average dispersion in the cavity is approximately 0. The cavity is terminated with the Faraday mirror 94 which simultaneously reflects signal and idler pulses of multiple wavelengths. A 10/90 coupler 92 couples the signal and idler pulses out of the cavity.

Figure 13A:
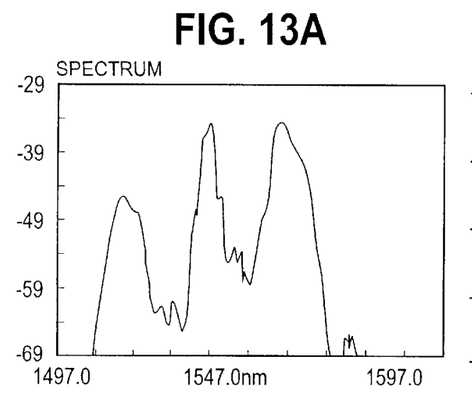
FIGS. 13A and 13B illustrate the spectrum multi-wavelength signal and idler pulses obtained with the system of FIG. 12 and the elimination of the signal pulses of one wavelength when the pump power is decreased.
Figure 13B:
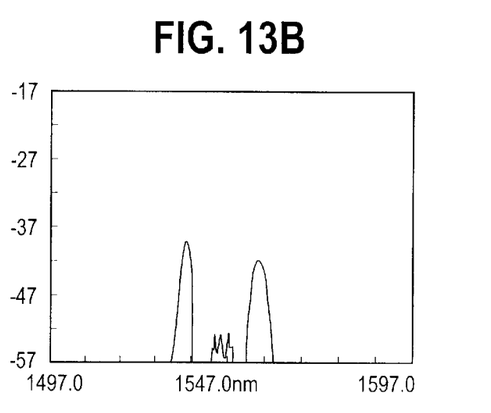

When the round-trip time of the signal pulses equals an integer multiple of the pump repetition period, the signal pulses reflected by the Faraday mirror 94 interact with the pump pulses and experience parametric gain. The oscillating wavelengths are determined by the following phase-matching condition:

$$\Delta\lambda_{S,I} = \pm c \Big/ \lambda_p^2 (2\gamma P_0/\beta_2)^{\frac{1}{2}}$$

where $\Delta\lambda_{S,I}$ are the signal and idler wavelength shifts from the pump wavelength $\lambda_p$. $\beta_2$ the GVD coefficient at $\lambda_p$ and $P_0$ is the pump-peak power. For phase matching, the pump wavelength should be longer than the zero dispersion wavelength of the dispersion shifted fiber. FIG. 13A illustrates the spectra of the oscillating signal and the idler pulses. In FIG. 13A, the peak at 1554 nm represents one signal, the peak at 1534 nm represents the idler and the peak at 1514 nm represents the second wavelength signal. When the pump power is decreased from 5 mW to 2 mW, the second signal component disappears. The first signal and idler spectra also become cleaner as shown in FIG. 13B. It is noted, that it is possible to achieve a four-wavelength fiber optic parametric oscillator by utilizing a second FWM process in the dispersion shifted fiber while controlling the chirp of the pump pulses that is due to the SPM.

The above described fiber optic parametric oscillators provide tunable sources of short pulses for high speed (100 Gb/s and greater) all optical TDM/WDM communication systems. The fiber optic parametric oscillators of the present invention can also be used as optical storage devices. Parametric gain modulation can further be used for all-optical synchronization and clock recovery schemes as described below.

Figure 14:
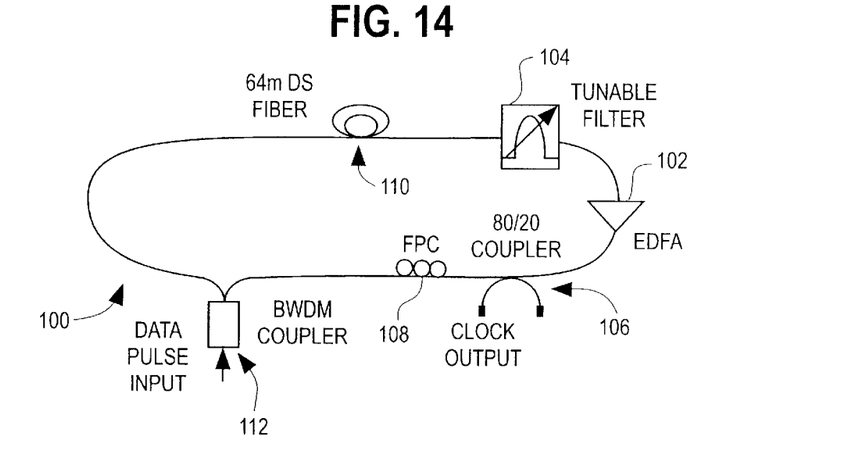
FIG. 14 is one embodiment of a clock recovery system utilizing a fiber optic parametric oscillator.

In one embodiment of a clock recovery system as shown in FIG. 14, a fiber optic parametric oscillator 100 is employed. The data rate in this scheme is limited only by the time response of the Kerr nonlinearity of the fiber which is in the femtosecond range. As a result, the clock recovery system is scalable to data rates that are in the Tbps range. Further, the recovered clock is wavelength tunable over the entire bandwidth of the Erbium-Doped-Fiber-Amplifier 102. The fiber optic parametric oscillator 100 is a singly resonant oscillator that is pumped by fixed wavelength pulses. A tunable filter 104 selects the desired wavelength of the clock pulses generated by the four wave mixing FWM process in the fiber optic parametric oscillator 100.

As shown in FIG. 14, the fiber optic parametric oscillator 100 is configured as a ring cavity in which the tunable filter 104 selects the desired signal or clock output wavelength. The oscillating signal is amplified by the Erbium-Doped-Fiber-Amplifier 108 to compensate for ring-cavity loss. An 80/20 coupler 106 splits 20% of the oscillating signal power to provide the clock output. The remaining 80% of the signal is passed through a fiber polarization controller 108 that is adjusted to compensate for birefringence of all of the fiber in the ring cavity. A 64 m long dispersion shifted fiber 110 having a zero dispersion wavelength of 1537 nm is the FWM medium. Input data pulses, forming pump pulses for the FWM process, are coupled into the fiber optic parametric oscillator by a Bandpass Wavelength-Division Multiplexer 112. When the input data represents all ones, the system functions as a pulsed fiber optic parametric oscillator. It is self-starting such that oscillating pulses build up from noise in the ring cavity while the tunable filter 104 selects the desired wavelength of the clock output. When the input data is a random sequence of pulses having similar average power, the fiber optic parametric oscillator 100 still oscillates as long as the gain of the amplifier 102 is adjusted to compensate for the total ring cavity loss. However, the amplifier 102 should be set below the threshold of CW oscillation in the ring cavity. It is noted, that the recovered clock wavelength can be continuously tuned over the whole bandwidth of the amplifier 102 except in the notch band of the BWDM coupler 112.

Figure 15:
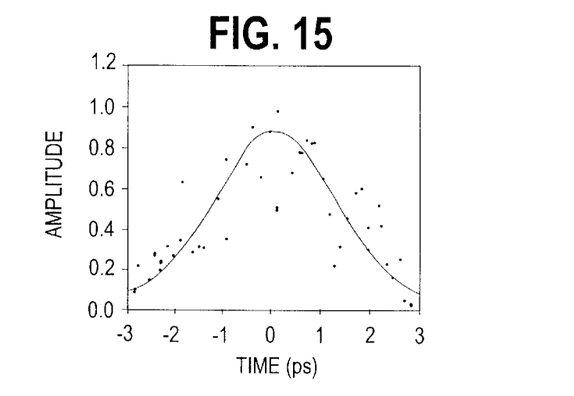
FIG. 15 illustrates an autocorrelation trace of the recovered clock pulses.
Figure 16A:
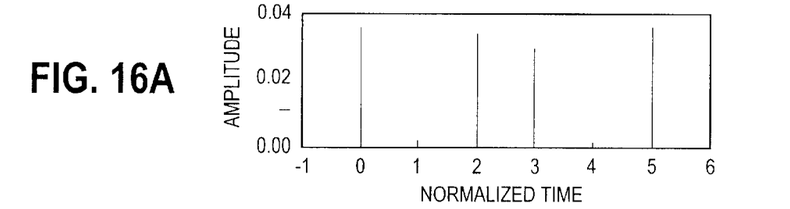
FIGS. 16A and 16B respectively show a sample of the pseudo-random input data pulses and the clock pulses recovered by the system of FIG. 14.
Figure 16B:
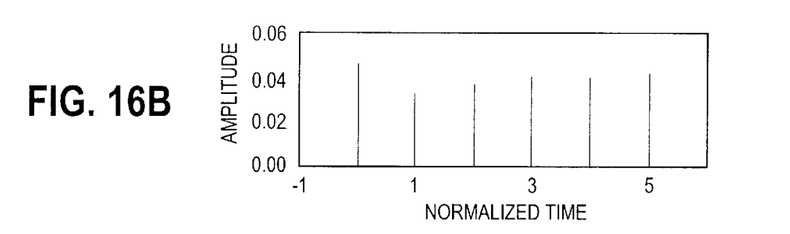

FIG. 15 and FIGS. 16A and B illustrate the results of the clock recovery scheme for a data stream that is a $2^7-1$ pseudo-random sequence of pulses with 2.9 ps FWHM at 14 MHz rate. The center wavelength of the data pulses is 1541.5 nm and the average power is 1.5 mW. For this average pump power, the output clock power is around 5 $\mu$W. FIG. 15 illustrates an autocorrelation trace of the recovered clock pulses when the tunable filter 104 is tuned to a clock wavelength of 1555 nm. The fluctuation in the data is due to the relatively small signal power available for the autocorrelation measurement. The solid line in FIG. 15 is a fitted curve to the autocorrelation based on $Sech^2$ intensity profile for the recovered clock pulses. The FWHM of the clock pulses is 1.95 ps. FIG. 16A shows a sample of the pseudo-random input data pulses; whereas, FIG. 16B illustrates the recovered clock pulses. By properly setting the fiber polarization controller 108 as discussed above, the clock recovery system is insensitive to the input data pulse polarization.

Figure 17:
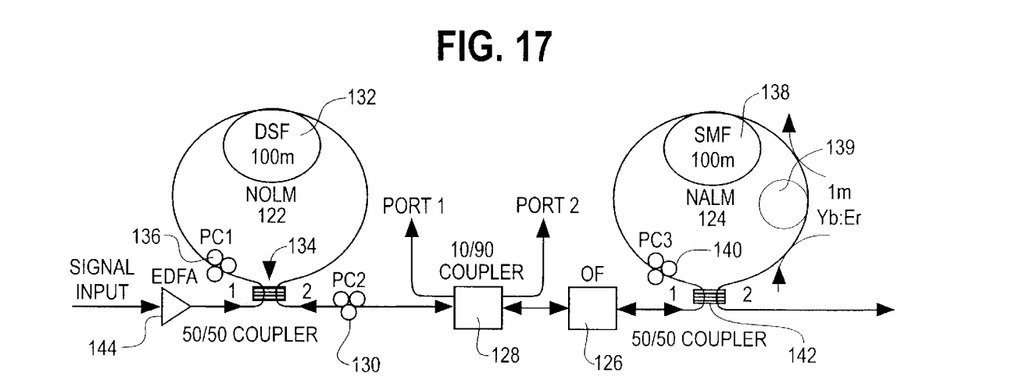
FIG. 17 illustrates another embodiment of the clock recovery scheme and laser synchronization.

FIG. 17 illustrates another embodiment of the clock recovery scheme with laser synchronization. This all-optical laser synchronization and clock recovery scheme combines the parametric gain modulation in a NOLM with the solutions-shaping property of a Nonlinear Amplifying Loop Mirror. As shown in FIG. 17, a Nonlinear Optical Loop Mirror 122 and a Nonlinear Amplifying Loop Mirror 124 form a Fabry-Perot cavity. A 3 nm bandwidth tunable optical filter 126 selectively transmits light at a particular wavelength which is the clock output wavelength. A 10/90 coupler 128 provides the mode-locked clock output at port 1. An intracavity polarization controller PC2 130 is utilized to make sure that after one round trip, the polarization state of the lasing light is the same.

The NOLM 122 consists of a 100 m piece of dispersion shifted fiber spliced to two 1.1 m leads of SMF-28 fiber from a 50/50 coupler 134 wherein the dispersion shifted fiber provides the parametric gain. The dispersion shifted fiber has a nonlinear coefficient of $\gamma=2.4$ $W^{-1}$ $km^{-1}$, zero dispersion wavelength of 1538 nm and a dispersion slope $dD/d\lambda= 0.06$ ps $nm^{-1}$ $km^{-1}$. The dispersion shifted fiber provides dynamic parametric gain and phase modulation via the processes of four-wave mixing and cross-phase modulation (XPM) when pumped by picosecond pulses. The NOLM 122 makes it easier to separate the input pump from the resulting signal and idler waves as long as it is set as a reflector by the proper adjustment of the polarization controller PC1 136.

The NALM 124 includes a nonlinear fiber portion 138 and an asymmetric fiber optic amplifier 139. More particularly, the NALM 124 consists of a 100 m piece of SMF-28 fiber spliced on one end to a 1 m piece of Yb:Er co-doped gain fiber pumped at 1047 nm, a polarization controller PC3 140 and a 50/50 coupler 142. The Yb:Er gain fiber 139 is spliced to one lead of the 50/50 coupler 142 in order to provide different intensities for the counter-propagating waves. The fiber on the polarization controller PC3 140 is spliced to the other lead of the 50/50 coupler 142. The polarization controller PC3 140 is adjusted to generate different linear phase retardation for the counter-propagating waves.

A passively mode-locked fiber laser, not shown, provides a 14 mHz train of 6.2 ps transform-limited soliton pulses at 1543 nm. The laser pulses are externally modulated to obtain a pseudo-random data input pattern and amplified to approximately 1.5 mW average power by a Erbium-Doped-Fiber Amplifier 144. To meet the four wave mixing phase matching condition for obtaining the parametric gain, the input signal is chosen longer than the zero dispersion wavelength of the dispersion shifted fiber.

Figure 18A:
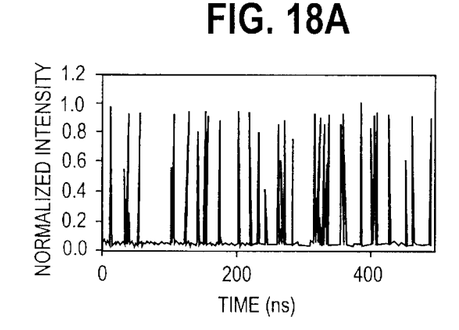
FIGS. 18A and 18B respectively illustrate pulses with random timing and the mode-locked clock pulses after adjustment of a polarization controller shown in FIG. 17.
Figure 18B:
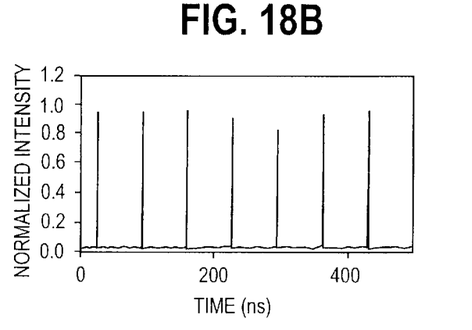

Initially, the NOLM 122 is set to a maximum reflecting state whereas the NALM 124 is set to approach a maximum transmitting state by adjusting the polarization controllers PC1 136 and PC3 140, respectively. The wavelength of the optical filter 126 is centered at 1551 nm. The gain of the Yb:Er gain fiber 139 inside the NALM 124 is controlled to make the Fabry-Perot resonator approach the CW lasing threshold but so that the resonator does not oscillate without the input signal. When the input signal is turned on and the round-trip time of the Fabry-Perot resonator equals an integer multiple of the period of the input signal clock, the pulsed fiber optic parametric oscillator signal at 1551 nm is generated due to the dynamic parametric gain in the NOLM 122. Further increasing the gain of the Yb:Er gain fiber 139 results in the appearance of a CW component at 1551 nm. By adjusting the polarization controller PC2 130 multiple pulses with random timing are observed as shown in FIG. 18A. Under this condition, by decreasing the pump power to the Yb:Er gain fiber 139, and adjusting the polarization controller PC2 130 strong and clear mode-locked pulses at the input signal's clock rate are observed as shown in FIG. 18B. The dynamic parametric gain in the NOLM 122 starts and synchronizes the recovered clock pulses while the NALM 124 enhances the reflectivity of the clock pulses and makes the Fabry-Perot laser synchronously mode-locked to the input signal. In some states of the polarization controller PC2 130, strong nanosecond-long mode-locked pulses at the fundamental repetition frequency, 0.83 MHz of the Fabry-Perot cavity can be observed.

Figure 19A:
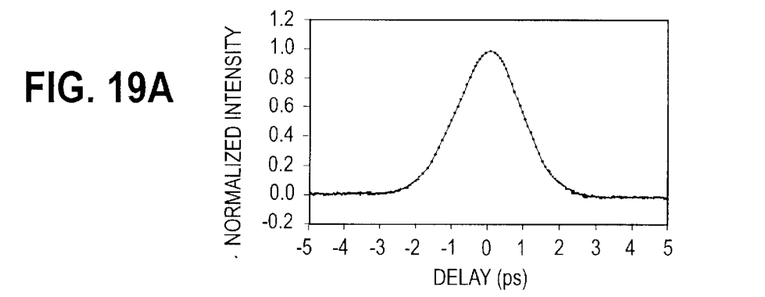
FIGS. 19A and 19B respectively illustrate the intensity autocorrelation trace of the mode-locked pulses obtained from port 1 shown in FIG. 17 and the optical spectrum of those pulses.
Figure 19B:
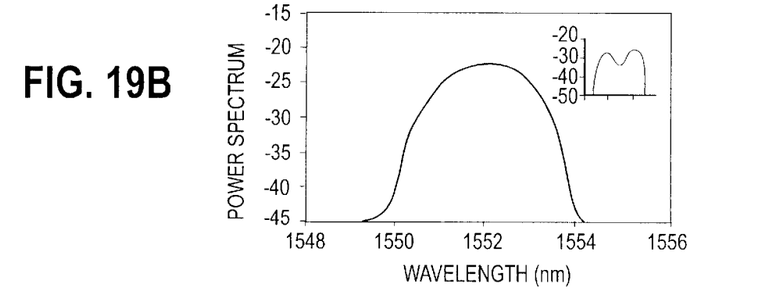
Figure 20A:
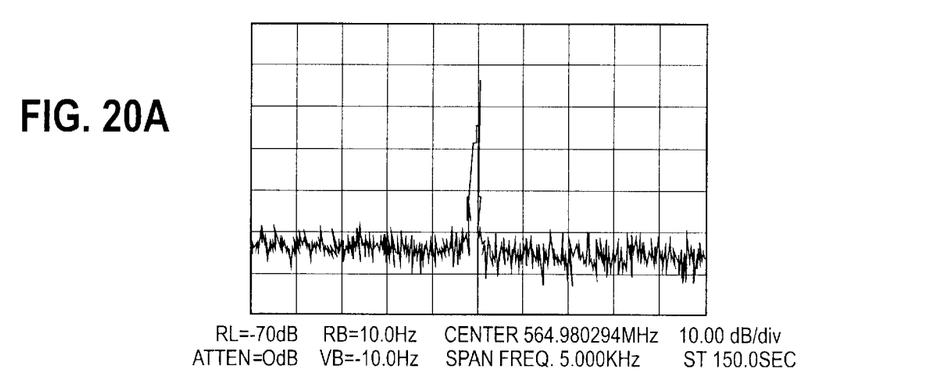
FIGS. 20A and 20B respectively illustrate the RF spectra of the $40^{th}$ harmonic of the synchronously mode-locked recovered clock signal and the input signal.
Figure 20B:
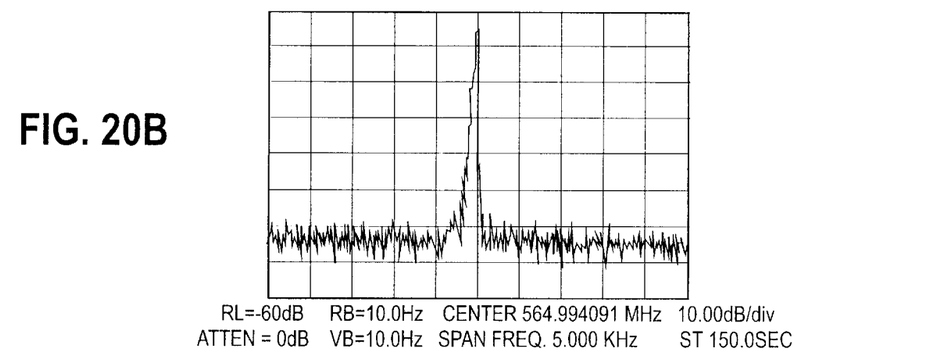

FIG. 19A illustrates the intensity autocorrelation trace of the mode-locked pulses obtained from port 1 of the 10/90 coupler 128; whereas FIG. 19B illustrates the optical spectrum of those pulses. The pulse width is $T_{FWHM}=1.3$ ps and the 3 dB bandwidth is $\Delta v=2$ nm. The time-bandwidth product is 0.33 and therefore, the mode-locked pulses are transform-limited solitons. The inset graph shown in FIG. 19B is the spectrum output from port 2 of the NALM 124. The notch at 1552 nm indicates the soliton shaping effect of the NALM 124. The soliton components are reflected back into the Fabry-Perot cavity while the non-soliton components, such as the residual chirp and the dispersion waves, are filtered out. FIG. 20A illustrates a plot of the RF spectra of the $40^{th}$ harmonic of the synchronously mode-locked clock signal and FIG. 20B is that of the input signal's source. The broad band wings characterizing the phase noise and the input signal are somewhat suppressed in the recovered clock. The relative RMS timing jitter in the mode-locked pulse train is estimated to be $\Delta t/T=6.4\times10^{-4}$.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A tunable fiber optic parametric oscillator comprising:
a fiber parametric amplifier receiving a pump wave and a synchronous signal wave, said amplifier separating the pump wave while amplifying the synchronous signal wave; and
a spectral filter receiving the signal wave from the amplifier, said filter being tunable to reflect at least one signal wave of a particular wavelength back to the fiber parametric amplifier.

2. A tunable fiber optic parametric oscillator comprising:
a pump for generating pump wave pulses;
a fiber Sagnac interferometer having a first port for the pump wave and a second port for a signal wave with a nonlinear fiber portion therebetween for amplifying a signal wave having a signal pulse coincident with a pump wave pulse and generating an idler wave, the pump wave being returned to the first port and the signal and idler waves passing through the second port; and
a spectral filter for receiving the signal and idler waves and being tunable for reflecting a signal wave of a particular wavelength back to the dispersion shifted fiber.

3. A tunable fiber optic parametric oscillator as recited in claim 2 wherein the nonlinear fiber portion is a dispersion shifted fiber.

4. A tunable fiber optic parametric oscillator comprising:
a fiber parametric amplifier receiving a pump wave and a synchronous signal wave, said amplifier separating the pump wave while amplifying the synchronous signal wave; and
a tunable optical filter receiving the signal from the fiber parametric amplifier, the filter being tuned to reflect at least one signal wave of a particular wavelength back to the fiber parametric amplifier.

5. A tunable fiber optic parametric oscillator as recited in claim 4 wherein said optical filter is a diffraction grating.

6. A tunable fiber optic parametric oscillator as recited in claim 5 wherein the optical filter is tuned by adjusting the angle of the diffraction grating.

7. A tunable fiber optic parametric oscillator as recited in claim 4 including an intracavity polarization beam splitter disposed between the optical filter and the fiber parametric amplifier for controlling the polarization of the signal wave directed back to the fiber parametric amplifier from the optical filter.

8. A tunable fiber optic parametric oscillator as recited in claim 4 including a fiber polarization controller disposed between the fiber parametric amplifier and the optical filter, the fiber polarization controller having an orientation set as a quarter wave plate.

9. A tunable fiber optic parametric oscillator as recited in claim 4 including a fiber polarization controller disposed between the fiber parametric amplifier and the optical filter, the fiber polarization controller having an orientation set so that the polarization of the signal wave tracks the polarization of the pump wave received by the fiber parametric amplifier.

10. A tunable fiber optic parametric oscillator as recited in claim 4 including a fiber polarization controller disposed between the fiber parametric amplifier and the optical filter, the fiber polarization controller having a Jones matrix, $$J = \begin{bmatrix} 1 & 0 \\ 0 & -i \end{bmatrix}.$$

11. A tunable fiber optic parametric oscillator as recited in claim 4 wherein said optical filter is a Faraday mirror.

12. A tunable fiber optic parametric oscillator as recited in claim 4 wherein said optical filter reflects multiple wavelengths.

13. A tunable fiber optic parametric oscillator as recited in claim 4 wherein said fiber parametric amplifier is a nonlinear optical loop mirror.

14. A tunable fiber optic parametric oscillator as recited in claim 4 including a passively mode-locked Er/Yb-doped fiber laser coupled to an erbium-doped fiber amplifier.

15. A tunable fiber optic parametric oscillator as recited in claim 4 operating at approximately a 1310 nm wavelength.

16. A tunable fiber optic parametric oscillator as recited in claim 4 wherein said fiber optic parametric oscillator is configured as a ring cavity with the fiber parametric amplifier and optical filter disposed therein and with a bandpass wavelength division multiplexer coupling pump pulses in the form of input data pulses to the fiber parametric amplifier, the oscillator further including a coupler disposed between the optical filter and the bandpass wavelength division multiplexer to couple a recovered clock wave having a wavelength selected by the optical filter out from the fiber optic parametric oscillator.

17. A tunable fiber optic parametric oscillator as recited in claim 4 wherein said fiber parametric amplifier is configured as a nonlinear optical loop mirror that is coupled via the optical filter to a nonlinear amplifying loop mirror to form a Fabry-Perot cavity and further including a coupler disposed in the cavity between the nonlinear optical loop mirror and the optical filter to provide an output for a recovered clock wave having a wavelength selected by the optical filter.

18. A tunable fiber optic parametric oscillator comprising:
a nonlinear optical loop mirror having a coupler with a first port for a pump wave and a second port for a signal wave with a nonlinear fiber portion therebetween for amplifying a signal pulse coincident with a pump wave pulse, the pump wave being returned to the first port and the signal wave passing through the second port;
an optical filter tuned for reflecting a signal wave of at least one particular wavelength back to the nonlinear optical loop mirror for parametric gain; and
a fiber polarization controller coupled between the second port of the nonlinear optical loop mirror and the optical filter and having an orientation set to cause the polarization of the signal wave to track the polarization of the pump wave to provide a tunable fiber optic parametric oscillator that is substantially insensitive to the polarization of the pump wave.

19. A tunable fiber optic parametric oscillator as recited in claim 18 wherein said optical filter is a diffraction grating.

20. A tunable fiber optic parametric oscillator as recited in claim 19 wherein the optical filter is tuned by adjusting the angle of the diffraction grating.

21. A tunable fiber optic parametric oscillator as recited in claim 18 wherein the orientation of said fiber polarization controller is set as a quarter wave plate.

22. A tunable fiber optic parametric oscillator as recited in claim 18 wherein the fiber polarization controller has a Jones matrix, $$J = \begin{bmatrix} 1 & 0 \\ 0 & -i \end{bmatrix}.$$

23. A tunable fiber optic parametric oscillator as recited in claim 18 wherein said coupler of the nonlinear optical loop mirror is polarization-independent.

24. A tunable fiber optic parametric oscillator as recited in claim 18 wherein said nonlinear optical loop mirror includes a fiber polarization controller adjusted so that the pump pulses are substantially totally reflected out of the nonlinear optical loop mirror through the first port.

25. A tunable fiber optic parametric oscillator as recited in claim 18 wherein said optical filter is a spectrally selective grating mounted in a Littrow configuration.

26. A tunable fiber optic parametric oscillator as recited in claim 18 including a coupler disposed between the second port of the nonlinear optical loop mirror and the fiber polarization controller to provide an output port for a portion of the signal wave.

27. A tunable fiber optic parametric oscillator comprising:
a nonlinear optical loop mirror having a coupler with a first port for a pump wave and a second port for a signal wave with a dispersion shifted fiber portion therebetween for amplifying a signal pulse coincident with a pump wave pulse, the pump wave being returned to the first port and the signal wave passing through the second port;
an optical filter coupled in a cavity of the oscillator to the second port of the nonlinear optical loop mirror for selectively reflecting multiple wavelengths of the signal wave back to the nonlinear optical loop mirror for parametric gain; and
a coupler disposed between the second port of the nonlinear optical loop mirror and the optical filter to provide an output for a portion of the signal wave at the selected multiple wavelengths.

28. A tunable fiber optic parametric oscillator as recited in claim 27 wherein said optical filter is a Faraday mirror.

29. A tunable fiber optic parametric oscillator as recited in claim 27 wherein signal waves of two selected wavelengths are parametrically amplified.

30. A tunable fiber optic parametric oscillator as recited in claim 27 wherein signal waves of four selected wavelengths are parametrically amplified.

31. A tunable fiber optic parametric oscillator as recited in claim 27 wherein said optical filter automatically compensates for polarization of the signal waves.

32. A system for recovery of clock pulses with a tunable fiber optic parametric oscillator comprising:
a fiber parametric amplifier disposed in a ring cavity and having a nonlinear fiber portion receiving an input data signal to provide a pump wave for the fiber parametric amplifier;
a tunable optical filter coupled in the cavity to the fiber parametric amplifier for selecting a wavelength for a clock pulse signal to be recovered;
a fiber amplifier coupled in the cavity and having a gain adjusted to compensate for loss in the ring cavity;
a wavelength division multiplexer disposed in the cavity for coupling the input data signal to the fiber parametric amplifier and for passing the signal coupled from the optical filter back to the fiber parametric amplifier; and
a clock output coupler disposed in the cavity between the optical filter and the multiplexer for providing a portion of the signal coupled thereto from the optical filter as the recovered clock output and for coupling the remaining portion of the signal back to the fiber parametric amplifier for parametric gain.

33. A system for recovery of clock pulses with a tunable fiber optic parametric oscillator as recited in claim 32 including a fiber polarization controller disposed in the cavity and adjusted to compensate for birefringence.

34. A system for recovery of clock pulses with a tunable fiber optic parametric oscillator as recited in claim 32 wherein said amplifier is an erbium-doped fiber amplifier.

35. A system for recovery of clock pulses with a tunable fiber optic parametric oscillator as recited in claim 32 wherein the nonlinear fiber is a dispersion shifted fiber.

36. A system for recovery of clock pulses with a tunable fiber optic parametric oscillator as recited in claim 32 wherein said amplifier is a Raman fiber amplifier.

37. A system for recovery of clock pulses with a tunable fiber optic parametric oscillator comprising:

a nonlinear optical loop mirror having a coupler with a first port for receiving a data input signal to provide a pump wave for the nonlinear optical loop mirror, a second port for a clock signal, and a nonlinear fiber portion disposed therebetween for amplifying the clock signal pulses and separating the pump wave;

a nonlinear amplifying loop mirror coupled to the second port of the nonlinear optical loop mirror to form a Fabry-Perot cavity that is synchronously mode-locked with the input signal;

a tunable optical filter disposed between the nonlinear amplifying loop mirror and the second port of the nonlinear optical loop mirror for selecting the wavelength of the recovered clock signal; and a clock output coupler disposed between the tunable optical filter and the second port of the nonlinear optical loop mirror for providing an output for a portion of the recovered clock signal, and for coupling the remaining portion of the clock signal back to the nonlinear optical loop mirror for parametric gain.

38. A system for recovery of clock pulses with a tunable fiber optic parametric oscillator as recited in claim 37 including a fiber polarization controller disposed between the clock output coupler and the nonlinear optical loop mirror.

39. A system for recovery of clock pulses with a tunable fiber optic parametric oscillator as recited in claim 37 including an erbium-doped fiber amplifier coupled to the first port of the nonlinear optical loop mirror to amplify the input signal.

40. A system for recovery of clock pulses with a tunable fiber optic parametric oscillator as recited in claim 37 wherein the nonlinear fiber portion is a dispersion shifted fiber.

41. A system for recovery of clock pulses with a tunable fiber optic parametric oscillator as recited in claim 37 wherein said nonlinear amplifying loop mirror includes a nonlinear fiber portion and an asymmetric fiber optic amplifier.

* * * * *

UNITED STATES PATENT AND TRADEMARK OFFICE
CERTIFICATE OF CORRECTION

| | |
|---|---|
| PATENT NO. | : 6,501,591 B1 |
| APPLICATION NO. | : 09/431550 |
| DATED | : December 31, 2002 |
| INVENTOR(S) | : Prem Kumar et al. |

It is certified that error appears in the above-identified patent and that said Letters Patent is hereby corrected as shown below:

Column 1, lines 13-15, delete "This work was supported in part by the Defense Advanced Research Projects Agency through the AFOSR under Grant No. F49620-96-1-0262." and insert --This invention was made with government support under Grant No. F49620-96-1-0262 awarded by the Air Force Office of Scientific Research and DARPA. The government has certain rights in the invention.--

Signed and Sealed this

Nineteenth Day of October, 2010

David J. Kappos
*Director of the United States Patent and Trademark Office*